United States Patent Office 2,758,946
Patented Aug. 14, 1956

2,758,946

SILICONE WATER-REPELLENT COMPOSITIONS

David P. Spalding, Troy, and George E. Shepherd, Schenectady, N. Y., assignors to General Electric Company, a corporation of New York No Drawing. Application September 23, 1952,
Serial No. 311,158

3 Claims. (Cl. 117—135.5)

This invention is concerned with compositions of matter suitable for rendering various materials water-repellent, especially textile materials and papers. More particularly, the invention is concerned with a composition of matter comprising (a) an organopolysiloxane free of silicon-bonded hydrogen in which the organic groups are attached to silicon by carbon-silicon linkages, from 1.0 to 15 per cent of the organic groups being alkyl radicals containing from 8 to 18 carbon atoms, the remainder of the organic groups being methyl groups, and (b) an aminoplast resin selected from the class consisting of urea-aldehyde and melamine-aldehyde resins or condensation products.

It has been known heretofore that various products, for example, various textiles, can be rendered water-repellent by treatment of the latter with certain organo-silicon compositions. Thus, according to Norton Patent 2,386,259, various objects can be rendered water-repellent by treating them with the product of hydrolysis of a methyl dihalogenosilane of the formula $CH_3SiHX_2$ where X is a halogen. Based on the use of the hydrolysis product of a methyl dihalogenosilane described in the aforementioned Norton patent, mixtures of the latter material in combination with organopolysiloxanes free of silicon-bonded hydrogen have also been suggested for inducing water-repellency in textiles.

Heretofore, however, it has been found almost essential to employ as one of the ingredients used for treating the bodies to render them water-repellent, the hydrolysis product of a methyl dihalogenosilane whether hydrolyzed by itself or interacted in such a fashion as to obtain chain-stopped organopolysiloxanes containing intercondensed organosiloxy units, e. g., dimethylsiloxy units, free of silicon-bonded hydrogen, in addition to the organohydrogensiloxy units, e. g., methylhydrogensiloxy units ($CH_3SiHO$), containing silicon-bonded hydrogen. Although the water-repellency induced by the use of mixtures containing organopolysiloxanes having silicon-bonded hydrogens are relatively satisfactory, in the treatment of certain fabrics such as, for example, cotton, it has been found that after only a few launderings, the water-repellency is substantially reduced when tested in accordance with standard procedures to determine water-repellency and durabilities of such water-repellency. In addition, the essential ingredient employed in making organopolysiloxanes containing the silicon-bonded hydrogen, for instance, methyldichlorosilane ($CH_3SiHCl_2$), is difficult to obtain satisfactory yields employing any of the presently known methods for making organohalogenosilanes. Because of this, the demand for water-repellents containing hydrolysis products of methyldichlorosilane far exceeds the supply of this particular material. Moreover, water repellents employing organopolysiloxanes containing silicon-bonded hydrogen are usually employed in the form of solutions in organic solvents to minimize undesirable gelation of the organopolysiloxane. Such organic solvents are often undesirable because of fire and health hazards, while at the same time adding to the expense of the water-repellent, not only as a medium in which the organopolysiloxane is dissolved, but also because it makes the applying procedure more expensive. Finally, the organopolysiloxanes containing silicon-bonded hydrogen liberate hydrogen on standing, hence creating a hazardous condition.

One of the objects of this invention is to prepare organopolysiloxanes containing water-repellents capable of inducing improved water-repellency in various porous materials including textiles and paper.

Another object of the invention is to obtain water-repellent textiles possessing a high degree of water-repellency even after a relatively large number of launderings or dry cleanings, or both.

A still further object of the invention is to prepare a water-repellent composition capable of imparting a high degree of water-repellency to various materials employing a liquid medium for the organopolysiloxane composition which is free of fire and health hazards and, in addition, is relatively inexpensive.

Another object of the invention is to prepare water-repellent compositions based on a mixture of ingredients containing an organopolysiloxane free of silicon-bonded hydrogen, thus obviating the necessity of using organosilicon intermediate compositions containing silicon-bonded hydrogen which are difficult to obtain.

An additional object of the invention is to impart an improved "hand" to textile materials by the use of organopolysiloxane-containing water-repellent compositions.

In accordance with our invention, we fulfill all the objects hereinbefore described and obviate all the deficiencies presently found in water-repellent compositions based on organopolysiloxanes containing silicon-bonded hydrogen by treating various bodies, for instance, textiles, papers, etc., with a mixture of ingredients comprising (a) an organopolysiloxane free of silicon-bonded hydrogen in which the organic groups are attached to silicon by carbon-silicon linkages, from 1.0 to 15 per cent of the organic groups being alkyl groups containing from 8 to 18 carbon atoms, the remainder of the organic groups being methyl groups, and (b) an aminoplast in the incompletely condensed state and selected from the class consisting of urea-aldehyde and melamine-aldehyde resins or condensation products.

It was entirely unexpected and in no way could it have been predicted that the use of the aforementioned combination of ingredients as treating materials would give the superior water-repellency results described above and more particularly illustrated in the example below, since attempts to use the individual active ingredients separately for the treatment of various materials gave markedly inferior results as far as water-repellency was concerned. Thus, some of the organopolysiloxanes herein described when employed alone although they were capable of inducing initial water-repellency, they had no durable effect on materials treated after one or two launderings. Also it was found that although the aminoplast resins employed in the practice of the present invention, when employed in combination with nylon cloth, do impart in some measure water-repellency, this water-repellency effect is greatly reduced after one or two launderings; the use of aminoplast resins on other types of textiles, for instance, cotton and rayon, imparts no appreciable water-repellency. The water-repellency effects realized in the practice of our invention are also markedly better than the water-repellency obtainable using, for instance, lauryl trichlorosilane in an organic solvent for treating the textile materials as has previously been suggested in the art.

Among the urea and melamine resins in the incompletely condensed stage which may be employed may be mentioned, for example, condensation products of either urea or melamine with any of the well known aldehydes, for instance, formaldehyde, acetaldehyde, propionaldehyde, furfural, etc. Preferably, we employ as the resinous component, namely, the aminoplast resinous component, a water-soluble low molecular weight condensation product of urea or melamine with formaldehyde, especially methylol ureas, for instance, dimethylol urea, etc., and the methylol melamines, for example, trimethylol melamine, hexamethylol melamine, etc. Of course, the use of organic-soluble aminoplasts, for instance, alcohol-soluble aminoplasts are not precluded and may be employed without departing from the scope of the invention.

The organopolysiloxanes free of silicon-bonded hydrogen which are employed in the practice of this invention are generally those consisting of silicon-oxygen linkages containing the stipulated monovalent hydrocarbon radicals attached to the silicon atoms of the organopolysiloxane by carbon-silicon linkages, and have an average ratio of from about 1.1 to 2.5, preferably from about 1.4 to about 2.1, hydrocarbon groups per silicon atom. These organopolysiloxanes free of silicon-bonded hydrogen (for brevity hereinafter referred to as "organopolysiloxane") may be either linear, cyclic, or branch-chained, and may be, for instance, oily materials, resinous materials, or even solids which are readily dispersible or soluble in solvents. The methods which may be employed for making many such organopolysiloxanes (which may also contain silicon-bonded hydroxyl groups) may be found disclosed, for instance, in Rochow Patents 2,258,218–222 and in Patnode Patents 2,469,888 and 2,469,890, all of the aforementioned patents being assigned to the same assignee as the present invention.

The organopolysiloxanes may be obtained by the hydrolysis of the proper methyl and long-chain alkyl halogenosilanes or any other hydrolyzable methyl silane and long-chain alkyl silanes containing silicon-bonded hydrolyzable groups. Thus, one may hydrolyze mixtures of, for example, dimethyl dichlorosilane with octyltrichlorosilane, dimethyl dichlorosilane with nonyltrichlorosilane, dimethyl dichlorosilane and lauryl trichlorosilane, mixtures of methyl trichlorosilane, dimethyl dichlorosilane and lauryl trichlorosilane, mixtures of dimethyldichlorosilane, methyl trichlorosilane and dilauryl dichlorosilane, mixtures of methyl trichlorosilane, dimethyl dichlorosilane, and methyl nonyldichlorosilane, mixtures of methyl trichlorosilane, dilauryl dichlorosilane and trimethyl chlorosilane, mixtures of octyl trichlorosilane, dimethyl dichlorosilane and methyl trichlorosilane, mixtures of dimethyl dichlorosilane, methyl trichlorosilane, trimethyl chlorosilane, lauryl trichlorosilane, and nonyl trichlorosilane, etc. Various isomeric hydrolyzable long-chain alkyl silanes may be employed without departing from the scope of the invention. It will, of course, be apparent to those skilled in the art that in the preparation of the organosiloxane, proper precautions should be taken in forming the mixtures of hydrolyzable organosilanes so as to have present in the hydrolysis product an organopolysiloxane in which from 1.0 to 15 per cent of the silicon-bonded organic groups are long-chain alkyl groups containing from 8 to 18 carbon atoms, for instance, octyl, nonyl, decyl, dodecyl, stearyl, octadecyl, etc. radicals.

In employing the above-described organopolysiloxanes in our claimed water-repellent compositions, in order to obtain optimum water-repellency properties, it is advantageous to employ metallic salts effective for converting the organopolysiloxane to the substantially infusible and insoluble state. Among the salts which can be advantageously employed are the water-soluble metallic salts, for instance, zinc acetate, stannous chloride, stannic chloride, etc. Other suitable metallic salts may also be used as long as they are capable of effecting curing of the organopolysiloxane. Although water-soluble salts are more desirable because they can be employed in water emulsions or dispersions, nevertheless, other types of metallo-organic salts may be used which are soluble in organic solvents, or in the organopolysiloxane free of silicon-bonded hydrogen, or in some medium which permits dispersion of the metallic salt so as to bring it into intimate contact with the organopolysiloxane and permit the metallic salt to exercise its curing function.

The amount of metallic salt used may be varied widely without departing from the scope of the invention. Thus, on a weight basis and based on the weight of the organopolysiloxane free of silicon-bonded hydrogen, the metal in the metallic salt may comprise from about 0.1 to about 20 per cent, by weight, or more, optimum results generally being obtained in the range of from about 5 to 12 per cent by weight, especially when employing an inorganic zirconium salt. The amount of metallic salt employed with the water-repellent composition will depend upon such factors as, for instance, the particular metallic salt used (including the metal ion), the particular type of organopolysiloxane employed, the type of material (e. g., textile, paper, etc.) to which the water-repellent composition will be applied, the solubility of the metallic salt as well as the medium in which the metalic salt will be used, the treating conditions including the temperature and time of treatment, the presence or absence of pressure during application of the water-repellent composition to the treated material, etc.

The proportion of urea or melamine resins used with the organopolysiloxane may also be varied within very wide limits without departing from the scope of the invention. Generally, in a treating mixture, on a weight basis, considering only the weight of the aminoplast and the organopolysiloxane free of silicon-bonded hydrogen, one may advantageously employ for each part of organopolysiloxane in the treating mixture, from about 0.5 to 10 to 12 parts of the aminoplast resin, preferably from about 1 to 10 parts of the aminoplast resin per part of organopolysiloxane. Depending on the degree of water-repellency desired, on a percent weight basis, it may be found advantageous to employ the organopolysiloxane in an amount ranging from about 5 to 50 per cent of the weight of the aminoplast resin, preferably from about 10 to 35 per cent, by weight, thereof.

Generally it is also desirable in employing the mixture of ingredients which we have found eminently suitable for inducing water-repellency, to also incorporate a curing agent for the aminoplast resin. Although in some instances, the metallic salt employed in combination with organopolysiloxane may also cause curing of the aminoplast resin to the substantially infusible and insoluble state, nevertheless, it is desirable to incorporate a separate curing agent for the aminoplast resin. Among such curing agents or catalysts which may be used expressly for the purpose of accelerating the cure of the aminoplast are, for instance, ammonium chloride, the ammonium phosphates, urea hydrochloride, chloroacetamide, aniline hydrochloride, etc., as well as other weakly acidic materials widely employed for the purpose in the art. Obviously, the amount of cure accelerator employed for the purpose of accelerating the cure of the aminoplast resin may be varied within wide limits and generally is advantageously employed in amounts ranging, by weight, from about 1 to 20, preferably from about 5 to 15 per cent, based on the weight of the aminoplast resin.

The mixture of the organopolysiloxane free of silicon-bonded hydrogen, aminoplast resin (including its own curing catalyst), and the metallic salt may be applied directly to the material desired to render water-repellent in any suitable manner. It is preferred to employ the mixture of ingredients in the form of either a dispersion or emulsion or as a solution (either true or colloidal solutions), wherein common solvents usually employed for the purpose are used as, for instance, aromatic hydrocarbons, chlorohydrocarbons, ethers, alcohols, etc., such as benzene, xylene, toluene, methylene chloride, trichloroethylene, dioxane, ethanol, butanol, or the like may be used. Generally it has been found desirable in making the treating composition (which will include, of course, the organopolysiloxane, the aminoplast resin, the metallic salt, any cure accelerator for accelerating the cure of the aminoplast, and the liquid medium, be it water or an organic solvent or mixture of both) that the mixture of active ingredients comprise on the order of from about 2 to 20 per cent of the weight of the treating composition designed for inducing water-repellency in the various materials.

The method whereby these treating mixtures may be prepared as well as the concentration of the various ingredients may obviously be varied widely without departing from the scope of the invention. For the most part, where the organopolysiloxane can be easily emulsified in water as the liquid medium, and where the metallic salt is of a water-soluble nature, or also easily emulsifiable, aqueous emulsions are advantageously used wherein emulsifying agents easily decomposable by heat are employed. In addition to such decomposable emulsifying agents, fugitive emulsifying agents, that is, emulsifying agents which are readily volatilized at temperatures at which drying and curing of the active ingredients in the water-repellent compositions present on the treated materials is effected, may also be used. The quaternary ammonium halides or salts are examples of suitable emulsifying agents. They are decomposed on heating for a brief period before, for instance, the cloth or paper is damaged by the heating. Examples of such materials are, e. g., the alkyl aryl ammonium chlorides, for instance, trimethylbenzyl ammonium chloride, hexadecyldimethylammonium chloride, etc. Non-cationic emulsifying agents, such as the amide condensation products of fatty acids with organic amines are preferred in the treatment of cotton, wool, rayon and nylon. An example of such a non-cationic emulsifying agent is the product known as "Pluramine S-100," marketed by the Kearney Manufacturing Co., Inc., Kearney, New Jersey. Obviously, the amount of emulsifying agent employed may be varied within wide limits. The actual amount of emulsifying agent employed will depend, for instance, upon the type of ingredients present in the mixture of ingredients, the type of emulsifying agent employed, the application intended, etc. Generally, the amount of emulsifying agent satisfactorily employed may range, for instance, from about 1.5 to about 3.5 per cent, by weight, based on the weight of the treating mixture. The amount used is not critical and persons skilled in the art will have no difficulty in determining easily the amount which gives optimum results.

One method for making the treating compositions herein described which have been found so eminently useful for inducing water-repellency comprises first homogenizing water with the emulsifying agent until a homogeneous suspension of the emulsifying agent in water is obtained, the latter material being generally a rather heavy creamy composition. To this is slowly added the organopolysiloxane which, for illustrative purposes, is an organopolysiloxane oil having a hydrocarbon-to-silicon ratio of about 1.9 to 2.1, containing a small amount of an emulsion stabilizer such as, for example, oleic acid, etc. This mixture of ingredients is in turn again thoroughly homogenized until the organopolysiloxane is intimately dispersed throughout the water phase. Finally, an additional quantity of water is added to this dispersion or emulsion to bring the organopolysiloxane content of the water emulsion to the desired level. This material is often referred to as a "master emulsion." The master emulsion is then diluted with an additional amount of water containing, for instance, the water-soluble metallic salt (assuming that such a salt is employed in this description). Generally, the concentration of the organopolysiloxane present at this stage is approximately twice that which will be ultimately employed in the final treating solution. To this latter mixture is then added an equal quantity, by weight, of the aminoplast resin dissolved in an appropriate solvent, for example, water (if the aminoplast is sufficiently water-soluble). This latter mixture of ingredients is then treated, e. g., homogenized, in such a fashion that intimate dispersion of the various ingredients is effected so as to give a stable emulsion which is employed as the water-repellent composition. The aminoplast solution which is added in the step described immediately above advantageously contains the cure accelerator for the aminoplast resin.

The procedure described above for preparing water emulsions of treating compositions herein described may, of course, be varied within wide limits and it is not intended that the description be limiting in any manner. Alternatively, where desired, organic solvents preferably those which are easily volatilized at the temperatures at which treating of the cloth will be effected, may be employed. Thus, the organopolysiloxane may be advantageously dissolved in an organic solvent (many examples of which have been given above), especially when using resinous organopolysiloxanes of low organic-to-silicon ratios. The solution of the organopolysiloxane may then be emulsified with water employing the usual emulsifying agents, diluted where desired, and solutions, for instance, aqueous solutions of the aminoplast resins, the metallic salt, and the catalyst for the aminoplast incorporated and further emulsification effected until a homogeneous composition suitable for treating purposes is obtained. In such instances where different phases are present in the same mixture of ingredients, adequate precaution must be exercised to prevent separation of the phases or a breakdown of the emulsion or dispersion.

On a weight basis, we have obtained satisfactory water emulsions in which from 70 to 98 per cent of the emulsion comprises water, from 0.5 to 25 per cent, by weight, comprises either the urea or melamine resin, and from 0.1 to 12 per cent, by weight, thereof comprises the organopolysiloxane. It will, of course, be apparent to those skilled in the art that the proportion of ingredients may be varied, as has been mentioned above, without departing from the scope of the invention.

One specific procedure for making the water-repellent treating materials employed in the practice of our invention comprises mixing the required amounts of either the urea or melamine resin (advantageously in the form of a water solution or paste) with a concentrated organopolysiloxane-water emulsion (e. g., a 10 to 75 per cent concentration of the organopolysiloxane), adding the metallic salt and other cure accelerator which may be desired for the aminoplast, and thoroughly agitating the combination of ingredients until a homogeneous emulsion is formed. If desired, this latter emulsion may be diluted further with water to comprise, for instance, a concentration in the range of from about 1.0 to 30 per cent, preferably from 3 to 15 per cent of active ingredients, namely the organopolysiloxane, the aminoplast, and the metallic salt.

The mixture of ingredients useful for effecting water-repellency either in the form of a solution or an emulsion or otherwise, may be applied to, for instance, any fabric or paper in any appropriate manner. Thus, the fabric may be dipped in the mixture of treating materials. The mixture may be applied to the fabric or paper by the use of dimensional equipment, such as a padder or quetch. The treating material may then be dried at temperatures ranging from about 50° to 250° C. to remove any water solvent, or organic solvent which may be present and also to set and cure the organopolysiloxane and aminoplast resin to an infusible and insoluble state whereby the fabric or paper is rendered permanently hydrophobic. If decomposable emulsifying agents are employed, the latter will be decomposed during this heating. Obviously, the temperature of cure will vary depending on the type of organopolysiloxane employed, the aminoplast used, the type of metallic salt, the concentration of the various ingredients, the material being treated, the length of time during which the material being rendered water-repellent is subjected to the elevated temperatures, etc. Generally, at the temperatures described above, and such temperatures should be below those at which undersirable deterioration of the textile or paper will take place, the time in which the treated material should be heated may range from about 10 seconds to about 5 to 10 minutes or even longer, for instance, as high as one-half hour. In some instances, it may be desirable to pass the treated textile or paper between squeeze rolls to increase the penetration of the water-repellent composition into either the fabric or paper, and to remove any excess of water-repellent comosition above that required to impart the desired degree of water-repellency. It is generally desirable that the water-repellent material should be applied to the textile or paper in such a manner that the latter picks up between 1 to 10 per cent, preferably between 1.5 and 5 per cent of the active treating material (i. e., the organopolysiloxane and aminoplast resin exclusive of solvent or water), based upon the weight of the textile or paper being treated. This, of course, will vary with the type of textile or paper being rendered water-repellent, the type of weave, etc.

In order that those skilled in the art may better understand how the present invention may be practiced, the following example is given by way of illustration and not by way of limitation. All parts are by weight. After treatment of the various cloths described in the following example with the various treating mixtures, each treated cloth was washed by agitating it for approximately five minutes in clear water to remove any water-soluble material, and was thereafter subjected to a water spray test using the method set forth in the 1945 Year Book of the American Association of Textile Chemists and Colorists, volume 22, pages 229 to 233.

EXAMPLE

In this example textile fabrics made from cotton, rayon and nylon were treated with two different types of water-repellent compositions. One organopolysiloxane employed in one of the two water-repellent treating compositions was obtained by cohydrolyzing dimethyldichlorosilane and lauryl trichlorosilane in which the latter comprised 10 weight per cent of the total weight of the two chlorosilanes. The liquid product thus obtained was identified as "Silicone Composition No. 1." Another organopolysiloxane was prepared by cohydrolyzing 20 weight per cent nonyl trichlorosilane and 80 weight per cent dimethyldichlorosilane. The liquid hydrolysis product thus obtained was identified as "Silicone Composition No. 2."

In order to prepare the water-repellent compositions employed in treating the various cloths described above, each of the silicone compositions described above was used with the aminoplast resin and the metallic salts as follows. More particularly, 40 grams of water were intimately mixed with about 7.5 grams of a non-ionic emulsifying agent, specifically, Pluramine S–100 described previously. Obviously, other types of suitable emulsifying agents may be employed. The mixture of water and emulsifying agent was thoroughly homogenized until a thick creamy mixture was obtained. To this creamy mixture were then added very slowly while continuing further homogenization, 77 grams of the respective silicone products described above together with one gram of oleic acid, as a stabilizing agent. After intimate homogenization of the ingredients, an additional 73.5 grams of water were added and the entire mixture intimately mixed to give a homogeneous composition. This latter mixture of ingredients in the form of a homogeneous emulsion contained about 38.5 per cent, by weight, silicone. About 20 grams of the last-described emulsion were then diluted with about 128 grams of water and about 2 grams of zinc acetate added and again thoroughly mixed. Thirty grams of a liquid consisting of a water-soluble melamine-formaldehdyde resin and water, of which liquid 80 per cent was the melamine-formaldehyde resin (Calco M–3 manufactured by the American Cyanamid Company) were added to 118 grams of water together with about 2 grams of an aminoplast accelerator, specifically, diammonium phosphate, and this mixture of ingredients thereafter formed a homogeneous solution. This latter melamine-formaldehyde resin solution containing the curing agent was then mixed with the final silicone emulsion (containing the zinc acetate) described above and the ingredients thoroughly mixed until a stable homogeneous emulsion was obtained. This procedure was employed in connection with all three silicone compositions described previously.

The two silicone water-repellent compositions described above will be found to comprise aqueous emulsions containing approximately 2.5 per cent, by weight, of the methylpolysiloxane, 8 per cent, by weight, of the water-soluble melamine-formaldehyde resin, and about 8 per cent, by weight, of the water-soluble metallic salt (calculated as the metal), based on the weight of the particular methylpolysiloxane employed. In each of the above silicone water-repellent compositions were immersed 8″ x 8″ squares of cotton cloth, rayon cloth and nylon cloth (three samples of each cloth) for about 30 seconds, the samples withdrawn and run through a padder or quetch adjusted to a pressure of about 45 to 60 pounds in order to remove excess treating solution, the immersion in the silicone water-repellent composition and the passage through the padder being carried out three times on each piece of cloth in order to assure complete impregnation of the cloth. The cloths were dried and hung in a 150° C. air-circulating oven for about 10 minutes to effect cure and conversion of the methylpolysiloxane and the melamine-formaldehyde resin. After removal from the oven and cooling to room temperature, each sample was rinsed in warm water for about five minutes to remove any residual water-soluble materials, and then dried at about 75° C. for about 45 minutes. Each sample of treated cloth was then conditioned in the air for about four hours and thereafter subjected to spray rating tests similar to those described in the aforementioned 1945 Year Book of the American Association of Textile Chemists and Colorists. The following table shows the results of the initial spray rating on the various cloths, the spray rating after the stipulated number of launderings, and the spray rating after the stipulated number of dry cleanings. It will be noted that the letters appearing under the heading "Initial spray rating" are intended to indicate that sample A was used in the subsequent laundering tests, sample B was used in the subsequent dry cleaning tests, and sample C when available was retained for future reference if it became necessary. The headings "C," "R," and "N" are intended to refer to cotton cloth, rayon cloth, and nylon cloth, respectively.

A spray rating of about 80 or above is considered satisfactory. If the spray rating dropped to 70 for two consecutive launderings or dry cleanings, generally the tests were discontinued.

Table

| Organopolysiloxane in Water-repellent Composition | | Initial Spray Rating | | | Laundering Cycles | | | | Dry Cleaning Cycles | | | |
|---|---|---|---|---|---|---|---|---|---|---|---|---|
| | | A | B | C | 1 | 2 | 3 | 4 | 1 | 2 | 3 | 4 |
| Methyl Lauryl Polysiloxane | C | 90 | 90 | 100 | 100 | 80 | 80 | 80 | 90 | 70 | 80 | 70 |
| | R | 90 | 100 | 90 | 80 | 70 | 70 | ---- | 80 | 80 | 70 | 70 |
| | N | 100 | 100 | 90 | 100 | 100 | 100 | 100 | 90 | 80 | 80 | 70 |
| Methyl Nonyl Polysiloxane | C | 90 | 80 | 90 | 80 | 80 | 80 | 80 | 80 | 70 | 80 | 80 |
| | R | 90 | 90 | 90 | 90 | 90 | 90 | 90 | 80 | 90 | 80 | 80 |
| | N | 90 | 90 | 90 | 100 | 100 | 100 | 90 | 80 | 80 | 50 | ---- |

It will, of course, be apparent to those skilled in the art that in addition to the organopolysiloxanes free of silicon-bonded hydrogen disclosed in the foregoing examples, other organopolysiloxanes, many examples of which have been given previously may be employed without departing from the scope of the invention. The presence of allyl or vinyl groups may be included in the organopolysiloxane. It is to be understood that small amounts of organopolysiloxanes containing silicon-bonded hydrogen may be present in the water-repellent compositions herein described without detrimental effect. However, the presence of such organopolysiloxanes containing silicon-bonded hydrogen is not essential in the practice of the present invention, and in this respect the use of the water-repellent compositions herein described and claimed are unique insofar as is known in not requiring the presence of any organopolysiloxanes containing silicon-bonded hydrogen as was heretofore believed essential in the treatment of various fibrous sheet materials such as textiles and paper to render them water-repellent. Obviously, no useful purpose will be served to incorporate or use in our water-repellent compositions, organopolysiloxanes containing silicon-bonded hydrogen because of the expense of the latter materials and the unavailability of the intermediate compositions required to prepare these organopolysiloxanes containing silicon-bonded hydrogen.

It will also be apparent to those skilled in the art that in place of the agents for curing the organopolysiloxane employed in the examples above, other metallic salts, examples of which have been given previously, may be used with satisfactory results. In addition to the cloths described above, other textile materials as, for instance, wool, many of the newer synthetic fabrics made from, for example, the polyacrylonitrile fibers, etc., as well as various papers including kraft papers, wrapping papers, etc., may be treated with our water-repellent compositions to impart hydrophobic properties to the treated materials. Various containers, for instance, burlap bags, cardboard cartons, etc., may be rendered water-repellent or hydrophobic in accordance with the practice of the present invention. Obviously, it will be apparent to persons skilled in the art that the conditions of treatment and the proportions of ingredients may also be varied without departing from the scope of the invention. The optimum conditions for treatment can be readily determined and are not critical.

What we claim as new and desire to secure by Letters Patent of the United States is:

1. The process for rendering a wholly organic textile material water-repellent which comprises (1) applying to the surface of the textile material a mixture of ingredients, in the unreacted state and free of any composition containing silicon-bonded hydrogen, the said mixture of ingredients being dispersed in water and comprising (a) an organopolysiloxane obtained by cohydrolyzing dimethyldichlorosilane and a long-chain alkyl trichlorosilane selected from the class consisting of nonyltrichlorosilane and lauryltrichlorosilane, the long-chain alkyl groups in the aforesaid organopolysiloxane comprising from 1 to 15% of the number of silicon-bonded methyl groups, and the said organopolysiloxane containing an average of from 1.4 to 2.1 total methyl and long-chain alkyl groups, wherein all the organic groups are attached to silicon by carbon-silicon linkages, (b) an incompletely condensed water-soluble melamine-formaldehyde resin which is in the preformed unreacted state, and (c) a metallic salt curing agent for the above-mentioned methyl long-chain alkyl polysiloxane, the latter polysiloxane being present, by weight, in an amount equal to from 5 to 50% of the weight of the melamine-formaldehyde resin and the metallic salt comprising from 0.1 to 20%, by weight, of the above-mentioned methyl long-chain alkyl polysiloxane, and (2) heating the treated textile material at a temperature of from 50° to 250° C. until a water-repellent surface is obtained.

2. The process for rendering a wholly organic textile material water-repellent which comprises (1) applying to the surface of the textile material a mixture of ingredients, in the unreacted state and free of any composition containing silicon-bonded hydrogen, the said mixture of ingredients being dispersed in water and comprising (a) a methyl nonylpolysiloxane obtained by cohydrolyzing dimethyldichlorosilane and nonyltrichlorosilane, the said methyl nonylpolysiloxane containing from 1 to 15% nonyl groups based on the number of methyl groups, there being an average of from 1.4 to 2.1 total methyl and nonyl groups per silicon atom, all of the said methyl and nonyl groups being attached to silicon by carbon-silicon linkages, (b) an incompletely condensed water-soluble melamine-formaldehyde resin which is in the preformed unreacted state, and (c) zinc acetate, the methyl nonylpolysiloxane being present, by weight, in an amount equal to from 5 to 50% of the weight of the melamine-formaldehyde resin and the zinc acetate comprising from 0.1 to 20%, by weight, of the above-mentioned methyl nonylpolysiloxane, and (2) heating the treated textile material at a temperature of from 50° to 250° C. until a water-repellent surface is obtained.

3. The process for rendering a wholly organic textile material water-repellent which comprises (1) applying to the surface of the textile material a mixture of ingredients, in the unreacted state and free of any composition containing silicon-bonded hydrogen, the said mixture of ingredients being dispersed in water and comprising (a) a methyl laurylpolysiloxane obtained by cohydrolyzing dimethyldichlorosilane and lauryltrichlorosilane, the said methyl laurylpolysiloxane containing from 1 to 15% lauryl groups based on the number of methyl groups, there being an average of from 1.4 to 2.1 total methyl and lauryl groups per silicon atom, all of the said methyl and lauryl groups being attached to silicon by carbon-silicon linkages, (b) an incompletely condensed water-soluble melamine-formaldehyde resin which is in the preformed unreacted state, and (c) zinc acetate, the methyl laurylpolysiloxane being present, by weight, in an amount equal to from 5 to 50% of the weight of the melamine-formaldehyde resin and the zinc acetate comprising from 0.1 to 20%, by weight, of the above-mentioned methyl laurylpolysiloxane, and (2) heating the treated textile material at a temperature of from 50° to 250° C. until a water-repellent surface is obtained.

References Cited in the file of this patent

UNITED STATES PATENTS

| | | |
|---|---|---|
| 2,453,562 | Wright | Nov. 9, 1948 |
| 2,469,625 | Barry | May 10, 1949 |
| 2,500,842 | MacKenzie et al. | Mar. 14, 1950 |
| 2,500,843 | MacKenzie et al. | Mar. 14, 1950 |
| 2,588,365 | Dennett | Mar. 11, 1952 |
| 2,612,482 | Rosmussen | Sept. 30, 1952 |
| 2,673,824 | Biefeld | Mar. 30, 1954 |